United States Patent
Courtland

(10) Patent No.: US 9,845,041 B1
(45) Date of Patent: Dec. 19, 2017

(54) VEHICLE RAMP SYSTEM

(71) Applicant: Arthur Courtland, Poplar Bluff, MO (US)

(72) Inventor: Arthur Courtland, Poplar Bluff, MO (US)

( * ) Notice: Subject to any disclaimer, the term of this patent is extended or adjusted under 35 U.S.C. 154(b) by 0 days.

(21) Appl. No.: 15/393,165

(22) Filed: Dec. 28, 2016

(51) Int. Cl.
*B60P 1/43* (2006.01)
*B62D 33/027* (2006.01)

(52) U.S. Cl.
CPC .............. *B60P 1/431* (2013.01); *B60P 1/435* (2013.01); *B62D 33/0273* (2013.01)

(58) Field of Classification Search
CPC .......... B60P 1/431; B60P 1/435; B60R 19/48
USPC ..................... 293/106; 296/61, 62
See application file for complete search history.

(56) References Cited

U.S. PATENT DOCUMENTS

| | | | | |
|---|---|---|---|---|
| 2,370,427 A * | 2/1945 | Sherry | ............... | B60P 1/431 414/537 |
| 5,813,714 A * | 9/1998 | Lipinski | ............... | B60P 1/435 296/61 |
| 6,119,634 A * | 9/2000 | Myrick | ............... | A01K 1/0272 119/847 |
| 7,533,923 B1 * | 5/2009 | Caldwell | ............... | B60P 1/431 296/61 |
| 2002/0145300 A1 * | 10/2002 | Webber | ............... | B60P 1/43 296/61 |
| 2008/0034512 A1 * | 2/2008 | Meyers | ............... | B60P 1/431 14/71.1 |
| 2008/0106058 A1 * | 5/2008 | Demick | ............... | B60P 1/43 280/164.1 |
| 2009/0214325 A1 * | 8/2009 | White | ............... | B60P 1/435 414/537 |
| 2012/0139281 A1 * | 6/2012 | Cousino | ............... | B62D 33/0273 296/61 |
| 2013/0294873 A1 * | 11/2013 | Chastain, Jr. | ............... | B60P 1/435 414/523 |
| 2014/0356117 A1 * | 12/2014 | Barger | ............... | G01N 23/04 414/523 |
| 2016/0144759 A1 * | 5/2016 | DiBlasio | ............... | B60P 1/435 414/537 |

* cited by examiner

Primary Examiner — Jason S Morrow
(74) Attorney, Agent, or Firm — Andrew Morabito

(57) ABSTRACT

An apparatus for conveniently loading or unloading objects to and from a cargo bed of a vehicle. The system includes at least one ramp, a bumper, and a tailgate. The ramp includes a retaining member extending therefrom. The bumper has a configuration capable of receiving therethrough at least a portion of the ramp, to store the ramp under the vehicle in a stored position. The tailgate includes a plurality of retaining openings defined therein. The retaining openings have a configuration capable of receiving at least a portion of the retaining member of the ramp, to place the ramp in an in-use position. The ramp can be retained in the stored position by way of engaging ledges, which can be easily disengaged by a user to withdraw the ramp for use in loading or unloading objects from the cargo bed.

18 Claims, 3 Drawing Sheets

VEHICLE RAMP SYSTEM

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of vehicle ramps and more specifically relates to a vehicle ramp system for use in connection with loading and unloading an object to and from a cargo bed.

2. Description of the Related Art

Portable ramps are commonly used for loading objects, such as, a garden tractor, a snowmobile, an all-terrain vehicle and equipment of the like into the bed of a pickup truck. The upper ends of the ramp boards are generally secured to the tailgate of the pickup truck to prevent accidents that can be caused by the slipping of a ramp board when equipment is being moved in or out of the truck box. Pickup trucks are also used to carry materials of all sorts and shapes and often slender objects that are longer than the truck box. These long objects are generally laid against the edge of the closed tailgate and extend at the back of the truck box.

The tailgate attachments of the prior art are generally made for a single purpose, that is for holding one or more ramp members to the tailgate. When the ramp members are not used, the tailgate attachments are either carried loose inside the cargo bed or stowed away in a garage. Similarly, other tailgate ramp attachments available commercially are mounted permanently to the tailgate and do not enhance the practicability of the tailgate when the ramp members are not used.

The use of tailgate ramps is known in the prior art. More specifically, tailgate ramps heretofore devised and utilized are known to consist basically of familiar, expected and obvious structural configurations, notwithstanding the myriad of designs encompassed by the crowded prior art which have been developed for the fulfillment of countless objectives and requirements.

Various attempts have been made to solve the above-mentioned problems such as those found in U.S. Pat. No. 3,510,015; U.S. Pat. No. 5,971,465; U.S. Pat. No. 4,923,360; U.S. Pat. No. 3,756,440; U.S. Pat. No. 4,884,838; U.S. Pat. No. 5,244,335; U.S. Pat. No. 5,425,564; U.S. Pat. No. 5,133,584; U.S. Pat. No. D360,729; U.S. Pat. No. 5,273,335; U.S. Pat. No. 5,312,149; and Canadian Patent 1,071,811. This art is representative of vehicle ramps. None of the above inventions and patents, taken either singly or in combination, is seen to describe the invention as claimed.

Ideally, a vehicle ramp should provide means for storing the ramp with the vehicle and for adjustable mounting of the ramp at varying widths on a tailgate and, yet would operate reliably and be manufactured at a modest expense. Thus, a need exists for a reliable vehicle ramp system to avoid the above-mentioned problems. In this regard, the present invention substantially fulfills this need. In this respect, the vehicle ramp system according to the present invention substantially departs from the conventional concepts and designs of the prior art, and in doing so provide an apparatus primarily developed for the purpose of loading and unloading an object to and from a cargo bed.

BRIEF SUMMARY OF THE INVENTION

In view of the foregoing disadvantages inherent in the known vehicle ramps art, the present invention provides a novel vehicle ramp system. The general purpose of the present invention, which will be described subsequently in greater detail is to provide a storable ramp system for loading and unloading an object to and from a cargo bed of a vehicle.

The present invention is a vehicle ramp system that provides a convenient way to load or unload objects to and from a cargo bed of a vehicle, while storing at least one ramp with the vehicle. To attain this, the present invention essentially includes at least one ramp, a bumper, and a tailgate. The ramp includes a retaining member extending therefrom. The bumper has a configuration capable of receiving therethrough at least a portion of the ramp so as to store the ramp under the vehicle.

It can be appreciated that a bumper attachment can be mounted to an existing bumper with the bumper attachment including at least one ramp receiving means capable of receiving therethrough at least a portion of the ramp so as to store the ramp under the vehicle.

The tailgate can include a plurality of retaining openings defined therein. The retaining openings have a configuration capable of receiving at least a portion of the retaining member of the ramp, to place the ramp in an in-use position.

It can be appreciated that a tailgate attachment can be mounted to an existing tailgate with the tailgate attachment including the plurality of retaining openings.

The ramp can be retained in the stored position by way of a ledge of the retaining member which is engageable with a retaining ledge of a retaining edge associated with a ramp receiving bore defined in the bumper.

The ramp can include an elongated ramp body, and a mounting end extending from an end of the ramp body at an angle in relation to a longitudinal axis of the ramp body. The ramp body can include a plurality of ridges extending from a top side of the ramp body to assist in traction and/or grip during loading or unloading of the object.

There has thus been outlined, rather broadly, features of the invention in order that the detailed description thereof that follows may be better understood and in order that the present contribution to the art may be better appreciated.

The invention may also include at least one support bracket mountable to an underside section of the vehicle. The support bracket can have a configuration capable of slidably receiving at least a portion of the ramp. There are, of course, additional features of the invention that will be described hereinafter and which will form the subject matter of the claims attached.

Numerous objects, features and advantages of the present invention will be readily apparent to those of ordinary skill in the art upon a reading of the following detailed description, but nonetheless illustrative, embodiments of the present invention when taken in conjunction with the accompanying drawings.

As such, those skilled in the art will appreciate that the conception, upon which this disclosure is based, may readily be utilized as a basis for the designing of other structures, methods and systems for carrying out the several purposes of the present invention. It is, therefore, that the claims be regarded as including such equivalent constructions insofar as they do not depart from the spirit and scope of the present invention.

It is therefore an object of the present invention to provide a new and novel vehicle ramp system that has all of the advantages of the prior art ramps and none of the disadvantages.

It is another object of the present invention to provide a new and novel vehicle ramp system that may be easily and efficiently manufactured and marketed.

An even further object of the present invention is to provide a new and novel vehicle ramp system that has a low cost of manufacture with regard to both materials and labor, and which accordingly is then susceptible of low prices of sale to the consuming public, thereby making such vehicle ramp system economically available to the buying public.

Still another object of the present invention is to provide a new vehicle ramp system that provides in the apparatuses and methods of the prior art some of the advantages thereof, while simultaneously overcoming some of the disadvantages normally associated therewith.

Even still another object of the present invention is to provide a vehicle ramp system for loading and unloading an object to and from a cargo bed. This allows a convenient way to load or unload objects to and from a cargo bed of a vehicle, while storing a ramp under the vehicle for availability for use when required The present invention holds significant improvements and serves as a vehicle ramp system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, vehicle ramp system constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a vehicle ramp system and more particularly to a vehicle ramp system as used to improve the loading and unloading an object to and from a cargo bed of a vehicle.

Generally speaking, the vehicle ramp system disclosed herein is in the form of slide out ramps received through a bumper and stored under a cargo bed of the vehicle. The present invention is provided with at least a pair of ramps with a distance between the ramps being adjustable as per requirement and as per a size of the vehicle or object being loaded or unloaded from the cargo bed.

The advantages of the vehicle ramp system are that it provides a convenient way to make it easier to load or unload objects to and from the cargo bed. It can further be appreciated that the ramps can act as a tire traction system when a vehicle is stuck in snow or mud, by place the ramps under the tire.

Figure 1:
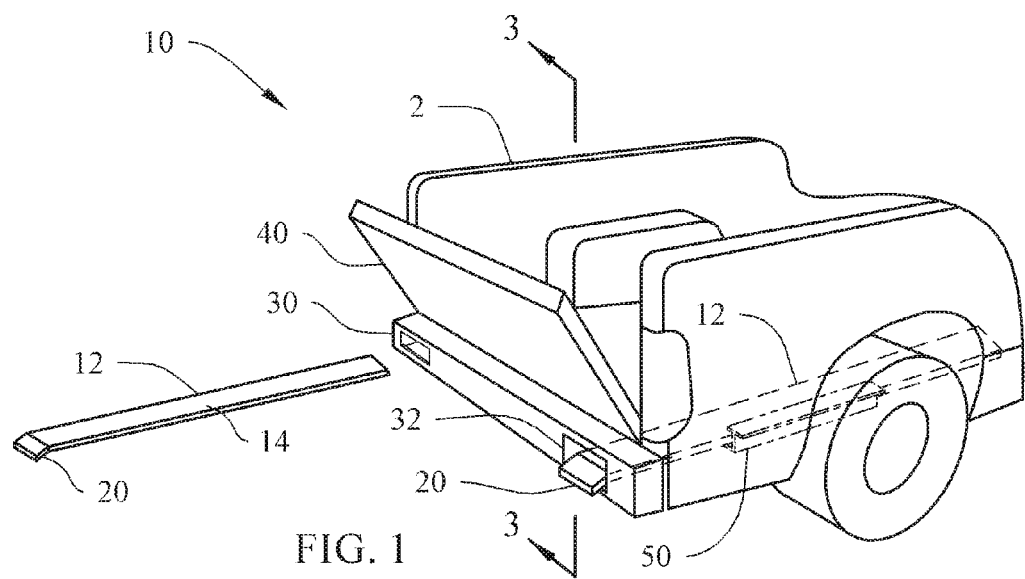
FIG. 1 shows a perspective view illustrating a vehicle ramp system according to an embodiment of the present invention with the ramp in the stored position.
Figure 2:
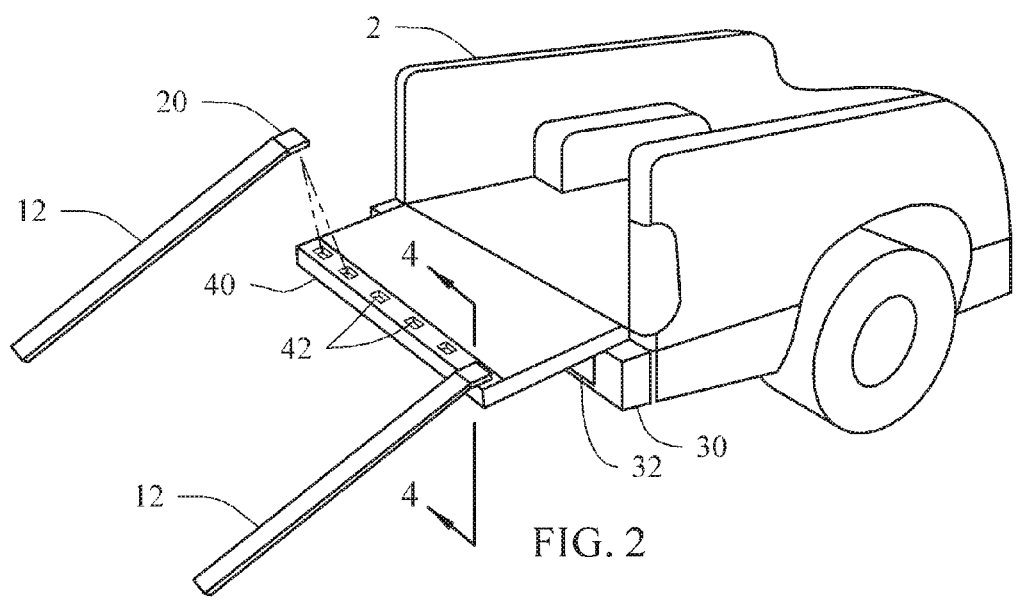
FIG. 2 is a perspective view illustrating a vehicle ramp system according to an embodiment of the present invention of FIG. 1 with the ramp in the in-use position.

Referring to the drawings by numerals of reference there is shown in FIGS. 1 and 2, a vehicle ramp system 10 of the present invention for loading and unloading an object to and from a cargo bed 2 of a vehicle is illustrated and will be described. More particularly, the vehicle ramp system 10 can include at least one ramp 12, a bumper 30, a tailgate 40, and a support bracket 50.

Figure 5:
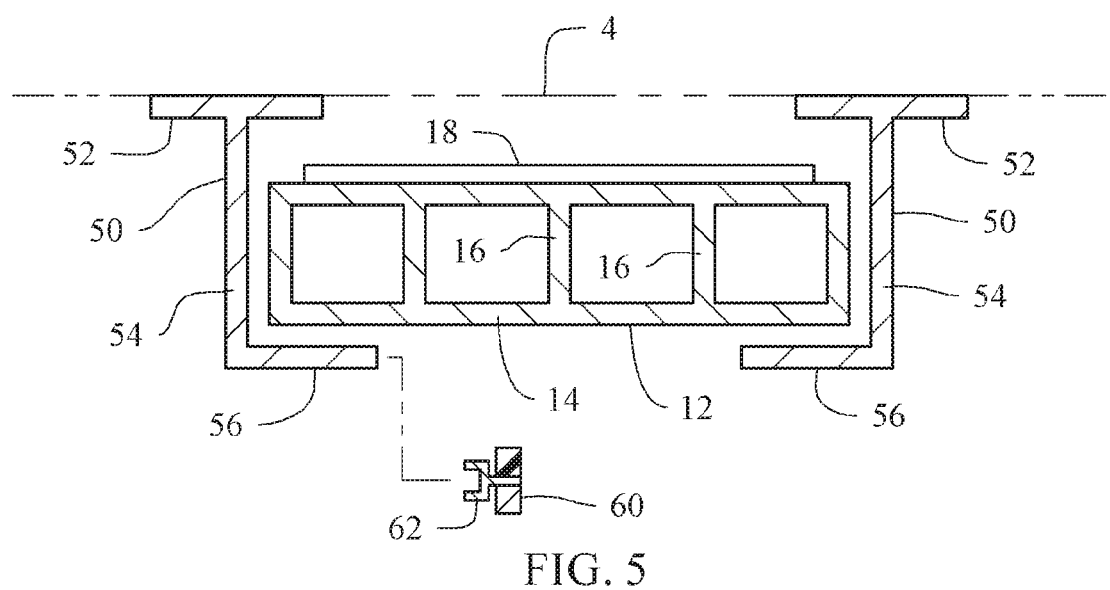
FIG. 5 is a cross-sectional view illustrating the ramp and support bracket of the present invention in the stored position taken along line 5-5 in FIG. 3.

The ramp 12 can include a ramp body 14, a mounting end 20, and a retaining member 24. A top side of the ramp body 14 can include a gripping texture, such as but not limited to a plurality of ridges 18 that extend therefrom. The ramp body 14 can include at least one internal wall 16 that defines open spaces below or in the ramp body 14, as best illustrated in FIG. 5. The internal wall 16 can create internal spaces thereby providing a lightweight ramp body 14 with sufficient strength to support the object being loaded or unloaded.

Figure 3:
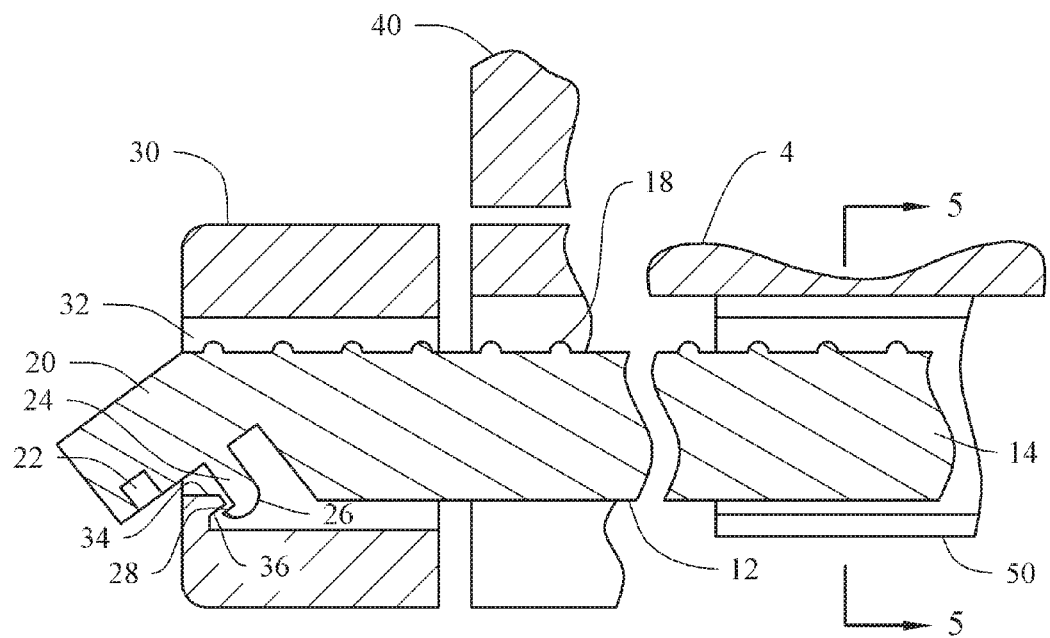
FIG. 3 is a cross-sectional view illustrating the ramp of the present invention in the stored position taken along line 3-3 in FIG. 2.
Figure 4:
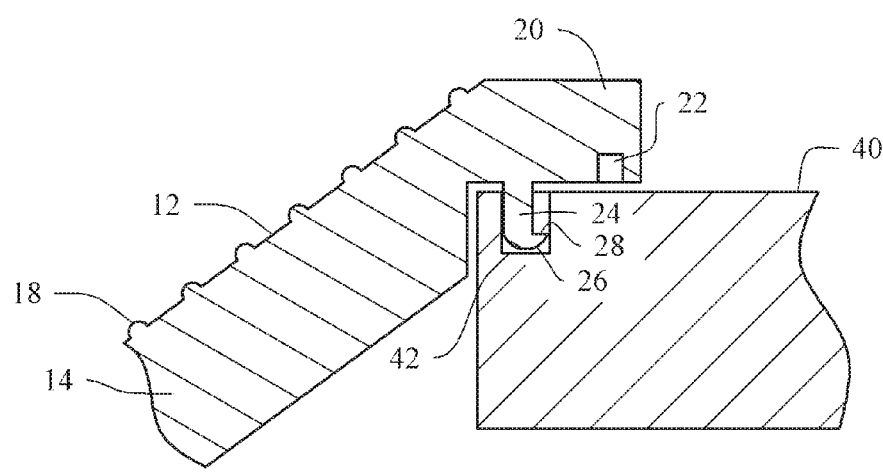
FIG. 4 is a cross-sectional view illustrating the ramp of the present invention attached to the tailgate in the in-use position taken along line 4-4 in FIG. 3.

Referring now to FIGS. 3 and 4, the mounting end 20 can extend from an end of the ramp body 14 at an angle in relation to a longitudinal axis of the ramp body 14. The mounting end 20 can include a notch 22 defined therein. The notch 22 can have a configuration capable of being grasped by a hand of a user, thereby allowing the user to pull, push or manipulate the ramp 12.

The retaining member 24 can be in the form of an extension wall, and can include a retaining tab 26. The retaining member 24 can extend away from a bottom side of the mounting end 20 in a direction perpendicular to a longitudinal axis of the mounting end. The retaining tab 26 can include a ledge 28 that can extend in a direction away from the retaining member 24 and in a direction parallel with the longitudinal axis of the mounting end 20.

The mounting end 20 can further having a thickness less than a thickness of the ramp body 14, thereby creating a transition edge in spaced apart relationship with the retaining member 24.

The bumper 30 can include at least one ramp receiving bore 32 defined therethrough. The ramp receiving bore 32 can have a configuration capable of receiving the ramp body 14. A retaining edge 34 can extend into the ramp receiving bore 32. The retaining edge 34 can include a retaining ledge 36 at a spaced apart relationship from a surface defining the ramp receiving bore 32.

The retaining ledge 36 can have a configuration capable of removably engaging with the ledge 28 of the retaining member 24 of the ramp 12, when the ramp 12 is in a stored position. The retaining ledge 36 can further include an angled surface that is parallel with the ledge 28 when the ramp 12 is in the stored position.

The retaining edge 34 retains the ramp 12 in the stored position, thereby preventing the ramp 12 from being withdrawn from the ramp receiving bore 32. A height of the ramp receiving bore 32 has a configuration capable of allowing the ramp 12 to be lifted up and away so that the ledge 28 is disengaged from the retaining ledge 36, thereby allowing the ramp 12 to be withdrawn from the ramp receiving bore 32, as best illustrated in FIG. 3.

The tailgate 40 can include a plurality of retaining openings 42 defined in along an area adjacent a free end of the tailgate 40. The number and location of the retaining openings 42 allow for the location of the ramp 12 to be adjusted.

The retaining openings 42 each can have a configuration capable of receiving therein at least a portion of the retaining member 24 of the ramp 12, when the ramp 12 is in an in-use position, as best illustrated in FIG. 4.

In the in-use position, the bottom side of the mounting end 20 can be flush with a side of the tailgate 40, thereby distributing a portion of a load on the ramp 12 more evenly. With the retaining member 24 received in at least one of the retaining openings 42, the free end of the tailgate 40 can be received between the retaining member 24 and the transition edge between the ramp body 14 and the mounting end 20. This would further prevent any unwanted movement of the ramp 12 during loading and/or unloading operations.

Referring now to FIG. 5, the support bracket 50 can include at least one mounting flange 52, at least one web 54, and at least one support flange 56. The mounting flange 52 can have a configuration capable of being attachable to an underside section of the vehicle, or can be integrally formed with the underside section. The mounting flange 52, for example, can be attached to a chassis or frame of the vehicle by a way of, but not limited to, bolts, screws, fasteners, clamps, clips, hooks or welding.

The web 54 can extend from the mounting flange 52 in a direction away from the underside of the vehicle. The support flange 56 can extend from the web 54 at a distance from the mounting flange 52 so as to sufficiently receive the ramp body 14 therebetween. The support flange 56 can have a configuration capable of slidably supporting the ramp body.

It can be appreciated that multiple support brackets 50 can be used to support both sides of the ramp body 14, with the support flange 56 of each support bracket 50 being orientated toward each other, thereby creating a rail configured to slidably receive the ramp body 14.

It can further be appreciated that a roller 60 can be associated with the support bracket 50 to assist in sliding the ramp body 14. The roller 60 could include a mounting sleeve 62 that can be attached at any location to a free end of the support flange 56.

In-use, it can now be understood that the ramp 12 can be stored under the cargo bed 2 in the stored position, or can be withdrawn to be used in the in-use position. This versatility provides the user with the option of always having the ramp 12 available for use.

The stored position features the ramp body 14 received through the ramp receiving bore 32 with at least a portion of the ramp body 14 being supported by the support flange 56 of the support bracket 50. The ledge 28 of the retaining member 24 is engaged with the retaining ledge 36 of the retaining edge 34, thereby preventing any unwanted withdrawal of the ramp 12.

To use the ramp 12, the user can grasp the mounting end 20 via the notch 22 and lift the ramp 12 up and away from the retaining edge 34. The user can then pull the ramp 12 out from the ramp receiving bore 32 of the bumper 30. The ramp 12 can then be oriented so that the retaining member 24 of the mounting end 20 is received in any one of the retaining openings 42 of the tailgate 40.

The in-use position features the mounting end 20 of the ramp 12 supported by the tailgate 40 with at least a portion of the retaining member 24 being received in at least one of the retaining openings 42 with the ramp body 14 extending away from the tailgate 40. A free end or a portion of the ramp body 14 can rest on the ground or other surface, thereby creating a ramp allowing the loading or unloading of objects from the cargo bed 2.

It can be appreciated that multiple ramps 12 can be used in combination with corresponding ramp receiving bores 32 and support brackets 50. A pair of ramps 12 can be attached to the receiving openings 42 of the tailgate 40 at a distance apart that corresponds to a wheelbase of equipment, such as but not limited to, a lawn mower, a lawn tractor, a trailer or all-terrain vehicle. This allows for the user to easily load or unload the equipment from to or from the cargo bed 2.

It can be further appreciated that the ramp 12 can include a conveyor belt system for loading or unloading material to and from the cargo bed 2.

It can be appreciated that the vehicle ramp system 10 may be sold as kit comprising the following parts: at least one ramp; at least one bumper; at least one tailgate; at least one support bracket; and at least one set of user instructions. The kit has instructions such that functional relationships are detailed in relation to the structure of the invention (such that the invention can be used, maintained, or the like in a preferred manner).

It can further be appreciated that the kit may alternatively include at least one ramp, at least one bumper attachment including the ramp receiving bore; at least one tailgate attachment including the plurality of receiving openings.

Vehicle ramp system 10 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A vehicle ramp system capable of loading and unloading an object to and from a cargo bed of a vehicle, said vehicle ramp system comprising:
   at least one ramp including a retaining member extending from said ramp;
   a bumper having a configuration capable of receiving therethrough at least a portion of said ramp; and
   a tailgate including a plurality of retaining openings defined in said tailgate, said retaining openings each having a configuration capable of receiving therein at least a portion of said retaining member of said ramp; and
   at least one support bracket mountable to an underside section of the vehicle, said support bracket having a configuration capable of slidably receiving at least said portion of said ramp.

2. The vehicle ramp system of claim 1, wherein said ramp further includes an elongated ramp body including a plurality of ridges extending from a top side of said ramp body.

3. The vehicle ramp system of claim 2, wherein said elongated ramp body further includes at least one open space defined therein, and at least one internal wall extending from said ramp body into said open space.

4. The vehicle ramp system of claim 2, wherein said ramp further includes a mounting end extending from a free end of said ramp body at an angle in relation to a longitudinal axis of said ramp body.

5. The vehicle ramp system of claim 4, wherein said mounting end further includes a notch defined therein, said notch having a configuration capable of being grasped.

6. The vehicle ramp system of claim 4, wherein said retaining member extends from said mounting end.

7. The vehicle ramp system of claim 4, wherein said retaining member extends from a bottom side of said mounting end in a direction substantially perpendicular to a longitudinal axis of said mounting end.

8. The vehicle ramp system of claim 6, wherein said retaining member further includes a retaining tab including a ledge extending in a direction away from said retaining member.

9. The vehicle ramp system of claim 8, wherein said bumper including:
   at least one ramp receiving bore defined therethrough, said ramp receiving bore having a configuration capable of receiving said ramp body therethrough; and
   a retaining edge extending into said ramp receiving bore, said retaining edge including a retaining ledge, said retaining ledge having a configuration capable of removably engaging with at least a portion of said ledge of said ramp.

10. The vehicle ramp system of claim 1, wherein said support bracket includes:
   at least one mounting flange having a configuration capable of being attachable to the underside section of the vehicle;
   at least one web extending from said mounting flange; and
   at least one support flange extending from said web, said support flange having a configuration capable of slidably supporting said portion of said ramp.

11. The vehicle ramp system of claim 1, wherein said receiving openings of said tailgate are located adjacent a free end of said tailgate.

12. A vehicle ramp system capable of loading and unloading an object to and from a cargo bed of a vehicle, said vehicle ramp system comprising:
   at least one ramp having a mounting end extending from a free end of said ramp including a retaining member extending from said mounting end, said retaining member includes a retaining tab including a ledge extending directionally away from the retaining member, and said mounting end extending from said free end of said ramp body at an angle in relation to a longitudinal axis of said ramp;
   a bumper having a configuration capable of receiving therethrough at least a portion of said ramp; and
   a tailgate including a plurality of retaining openings defined in said tailgate, said retaining openings each having a configuration capable of receiving therein at least a portion of said retaining member of said ramp; and
   at least one support bracket mountable to an underside section of the vehicle, said support bracket having a configuration capable of slidably receiving at least said portion of said ramp.

13. The vehicle ramp system of claim 12, wherein said ramp further includes an elongated ramp body including a plurality of ridges extending from a top side of said ramp body.

14. The vehicle ramp system of claim 12, wherein said mounting end further includes a notch defined therein, said notch having a configuration capable of being grasped.

15. The vehicle ramp system of claim 12, wherein said retaining member extends from a bottom side of said mounting end in a direction substantially perpendicular to a longitudinal axis of said mounting end.

16. The vehicle ramp system of claim 12, wherein said support bracket includes:
   at least one mounting flange having a configuration capable of being attachable to the underside section of the vehicle;
   at least one web extending from said mounting flange; and
   at least one support flange extending from said web, said support flange having a configuration capable of slidably supporting said portion of said ramp.

17. The vehicle ramp system of claim 12, wherein said receiving openings of said tailgate are located adjacent a free end of said tailgate.

18. The vehicle ramp system of claim 12, wherein said bumper including:
   at least one ramp receiving bore defined therethrough, said ramp receiving bore having a configuration capable of receiving said ramp body therethrough; and
   a retaining edge extending into said ramp receiving bore, said retaining edge including a retaining ledge, said retaining ledge having a configuration capable of removably engaging with at least a portion of said ledge of said ramp.

* * * * *